United States Patent [19]

Husnik

[11] Patent Number: 4,759,588
[45] Date of Patent: Jul. 26, 1988

[54] SEAT BELT TRAINING CUSHION

[76] Inventor: Monte J. Husnik, 7644 Surrey La., Oakland, Calif. 94605

[21] Appl. No.: 26,389

[22] Filed: Mar. 16, 1987

[51] Int. Cl.⁴ .................. A47D 13/08; B60N 1/12; B60R 22/10
[52] U.S. Cl. .................. 297/468; 297/181; 297/250; 297/482
[58] Field of Search .............. 297/181, 250, 468, 482, 297/488; 280/801

[56] References Cited

U.S. PATENT DOCUMENTS

| | | | |
|---|---|---|---|
| 3,241,881 | 3/1966 | Carnahan et al. | 297/468 |
| 3,366,294 | 1/1968 | Stephenson | 297/250 X |
| 4,291,915 | 9/1981 | Cox | 297/250 X |
| 4,595,618 | 6/1986 | Caringer | 297/482 X |
| 4,619,468 | 10/1986 | Spill | 297/488 X |

FOREIGN PATENT DOCUMENTS 2532141 2/1977 Fed. Rep. of Germany ...... 297/250
2342188 9/1977 France .................. 297/482

Primary Examiner—Kenneth J. Dorner
Assistant Examiner—Peter R. Brown
Attorney, Agent, or Firm—D. L. Tschida

[57] ABSTRACT

A padded automotive and child accessory seat cushion with arms for supporting and partially camouflaging a buckled restraint, whereby a seated child is distracted and comforted with separately surrounding padded arms. The arms extend from a cushion back, which is hingeably secured to a cushion seat and, relative to which back and arms, fasteners secure the restraint thereto. Buckles on the outer arm surfaces permit the adjustment of arm length and fasteners at the padded palms secure the arms to one another.

4 Claims, 3 Drawing Sheets

SEAT BELT TRAINING CUSHION

BACKGROUND OF THE INVENTION

The present invention relates to child training devices and, in particular, to a seat cushion for training a child in the use of provided seat belts and/or distracting the child's attention from the restraint.

While a variety of child carriers have been developed for supporting an infant in relative safety in an automotive seat, such carriers are typically of a rigid construction. They usually support the child in intervening relation to the seat belt, such that during a collision, the child remains seated with the shock being absorbed by the carrier. Additional restraints may also be included with the carrier for separately securing the child thereto.

While such devices have proved effective in reducing infant injuries, as the child outgrows the carrier and reaches an age where it is preferable to use the seat belts in their conventional fashion, the child may demonstrate an aversion to the restraint on his/her activity. Thus, it is believed that a need exists for an intermediate training device as the child is converted over from a rigid carrier to the use of the seat belts by themselves.

Specifically, the present invention contemplates a padded seat cushion assembly configured in various animal or cartoon character shapes or in a conventional shape with a brightly patterned fabric covering appealing to the child and having attached padded arms which are securable to one another and which may be encircled about the child in a "hugging" fashion. The padded arms are intended to partially camouflage the separately attached seat belts or other restraint and distract the child. The experience is thus made more pleasurable to the developing child and, over time, is believed to reinforce the desirability of buckling up when entering an automobile.

SUMMARY OF THE INVENTION

A principal object of the invention therefore is to provide an early and intermediate training device for teaching and reinforcing children with the desirability of buckling up.

It is a further object of the invention to provide a seat cushion of a design appealing to children and to which a provided seat belt or restraint may be attached.

It is a further object of the invention to provide an assembly which partially conceals the seat belts to lessen the child's awareness thereto and to distract the child, as well as comfort the child in a hugging grasp.

These and other objects are provided for in the presently preferred embodiment which includes a padded fabric covered cushion having a seat portion and a hingedly secured back portion from which a pair of arms extend. Depending upon the intended age group, the seat and/or back may be constructed in the shape of an animal with a pair of corresponding arms having palms, hoofs or paws.

Elastic fasteners mounted to the seat back and along the inner arm surfaces provide means for attaching the seat belts. Buckles mounted to the outside of the arms permit a length adjustment of each arm, while mating fasteners provided at the palms permit the attachment of one to the other in overlapping relation. Thus, upon securing the seat belt halves or primary restraint, the padded arms and palms partially hide the seat belt, while comforting and distracting the seated child.

The above objects, advantages and distinctions of the present invention, as well as others, along with its detailed construction, will become more apparent upon reference to the following description thereof with respect to the appended drawings. Before referring thereto though, it is to be appreciated that the following description is made by way of the presently preferred embodiment only and is not intended to be all-inclusive. Where modifications have been considered, they will be appropriately mentioned, but it is to be appreciated that still other modifications may be made without departing from the spirit and scope of the invention.

DESCRIPTION OF THE PREFERRED EMBODIMENT

Figure 1:
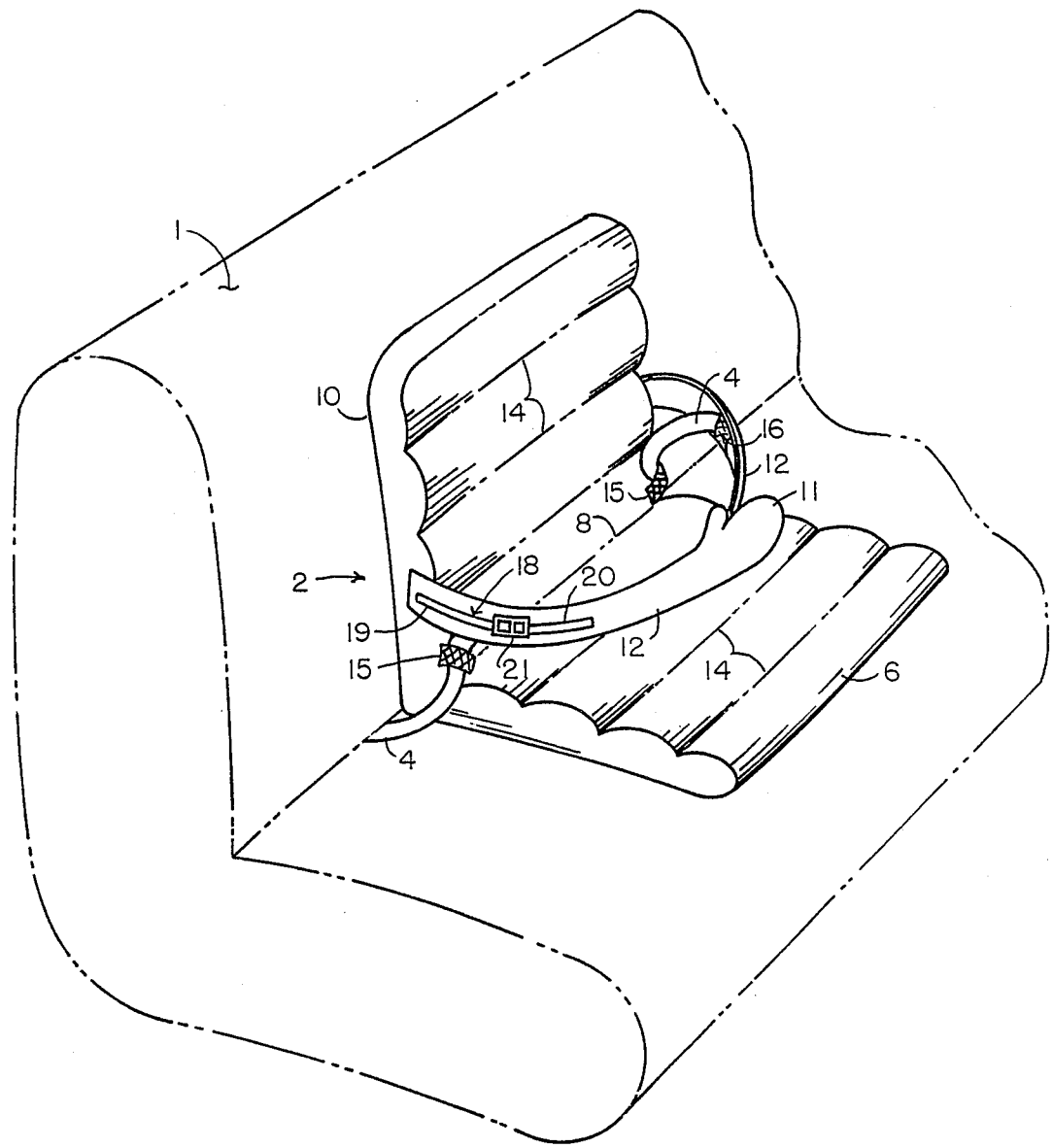
FIG. 1 shows a perspective view of the present seat cushion.

Referring to FIG. 1, a perspective view is shown of the present invention relative to an automotive seat 1. Generally, it comprises a padded child's seat cushion 2 for supporting the halves of an automobile seat belt 4 in partially hidden relation thereto. The seat cushion 2 is principally constructed of a flame-retardant material and includes a covered, washable foam or cotton padded seat portion 6 which is hingeably secured via a fabric hinge 8 to a similarly constructed padded back portion 10. Depending on the type of hinge, the back 10 and seat 6 may be separately detachable.

Secured adjacent the hinge 8 or approximately one-fourth to one-third of the way up the back 10 from each side are a pair padded arms 12. Depending upon the constructional design of the cushion seat 6 and back 10, the arms 12 and extreme ends 11 are compatibly designed relative to the intended character. For example, where the seat back 10 is constructed in the outline of a stuffed bear, as in FIG. 5, bear arms and paws are used. Otherwise, where, as in the embodiment of FIG. 1, a colored print fabric is used with a conventional cushion construction, human-like arms and palms are used.

Depending upon the age group with which the cushion 2 is used, the size may be adjusted. At present, it is contemplated that children of ages two through five would be the principal users of the cushion 2. Thus, in the presently preferred embodiment, the seat cushion 6 is constructed to be approximately 10 to 12 inches wide by 10 to 12 inches deep, while the back cushion 10 is approximately 10 to 12 inches tall. Depending further on the overall desired stiffness, the assembly 2 may be constructed in differing thicknesses with more or less padding or, alternatively, more or less pleats 14 and/or including insert members (not shown) sewn within the interiors thereof. For example, a cardboard or plastic stiffener might be inserted to maintain the back 10 upright, etc.

Sewn on each side of the back cushion 10 near the hinge 8 are a pair of elastic band members 15 which, in combination with a second pair of bands 16 secured midway along the inner surface of the arms 12, support the automotive seat belt 4. That is, upon positioning the cushion 2 on the car seat 1, the seat belt halves 4 are threaded through the band members 15 and 16. With the positioning of the child and the buckling of the seat belt 4, the arms 12 are overlapped and the palms 11 are secured to one another via Velcro TM fasteners (not shown).

While the seat belt 4 is not fully hidden, the arms 12 distract the child and provide a sensation of hugging and the fantasy of which may be reinforced by the parent. Over time, it is anticipated that with the continued use of the cushion 2, the child will look on the use of seat belts as a pleasurable or, at least, non-objectionable experience. Thus, as the cushion 2 is outgrown, the seat belts may be used by themselves; hopefully, without the child wriggling out of the belts 4 or otherwise defeating their intended purposes.

Appreciating that children of various sizes will use the cushion 2, length adjusters 18 are provided on the outer surfaces of each arm 12. They generally are comprised of a pair of lengths of fabric 19 and 20 which are sewn at one end to the arms 12 and at their opposite ends are mounted to a buckle 21. By cinching up on the longer strap 19, the arms 12 may be effectively shortened such that as the palms 11 are overlapped, they do so in closer engagement to the child. In lieu of buckle fasteners 21, it is to be appreciated that like the palm fasteners, Velcro TM fasteners, snap fasteners, buttons etc. may be substituted in an appropriate fashion.

It is also to be appreciated that while primarily intended for use with automotive seat belts, the invention has application for use with high chairs and other similar children's appliances.

Figure 2:
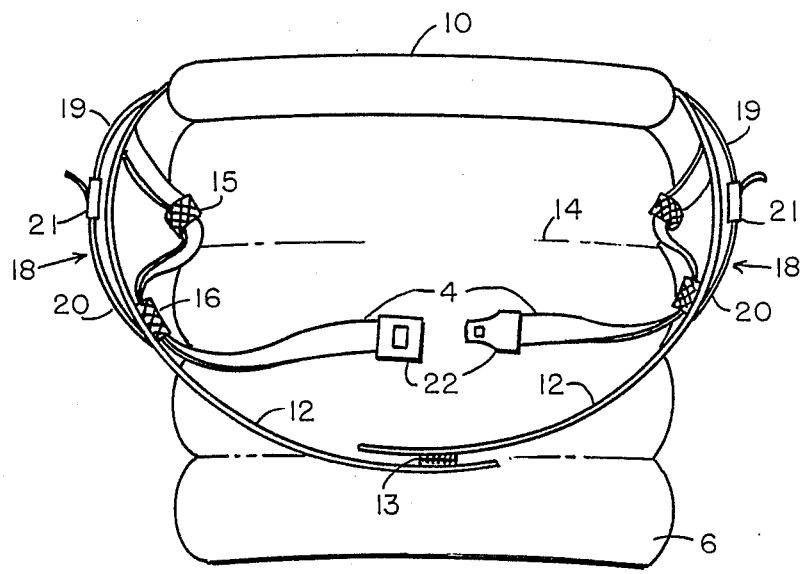
FIG. 2 shows a top elevation view of the cushion of FIG. 1.

Directing attention next to FIG. 2, a top view is shown of the present cushion 2 and wherefrom a better understanding may be had as to the mounting of the seat belt 4 to the elastic bands 15 and 16. From this view, the camouflaging effect of the arms 12 can also be better seen, along with depicting why a child can experience a hugging sensation.

Figure 3:
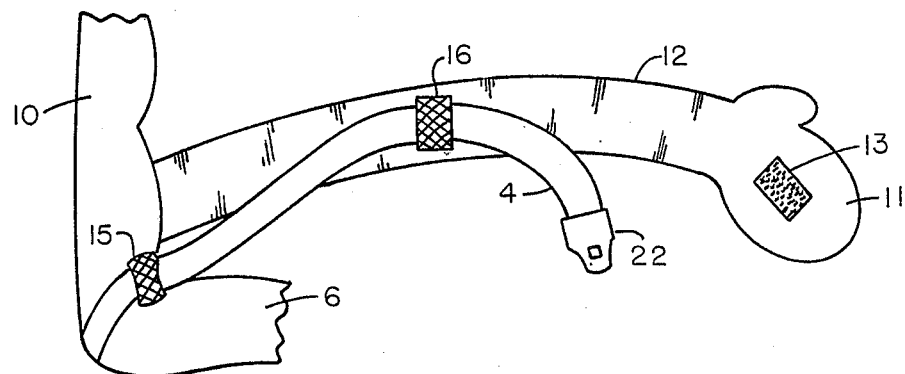
FIG. 3 shows a detailed side elevation view of the outer arm construction of one of the padded arms.
Figure 4:
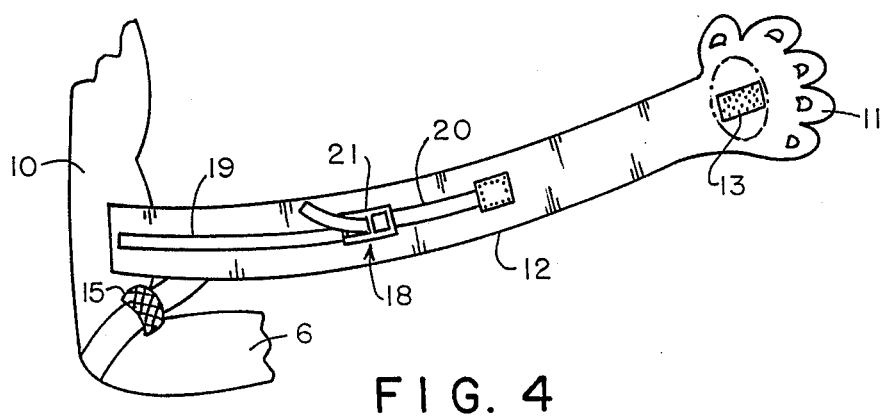
FIG. 4 shows a side elevation view of the inner construction of one of the padded arms.

Referring next to FIGS. 3 and 4, respective detailed side elevation views are shown of the outer and inner surfaces of the arms 12 relative to the elastic bands 15 and 16, the length adjusters 18 and mating Velcro TM palm fasteners 13. While too each seat belt 4 is presently supported with two elastic bands 15 and 16, it is to be appreciated that additional band members might be mounted along the arms 12. Alternatively, the arms 12 might be sewn to permit the threading of the seat belts 4 through the interior thereof such that only the buckle ends 22 are exposed from each arm 12. Such a construction, however, contemplates a more permanent mounting of the cushion assembly 2 for the seat 1, but for some children who are not easily distracted, this may prove necessary.

A further advantage of the latter construction is that the outside length adjusting assembly 18 may no longer be required, since the belt itself would tend to provide some bunching and shortening of the arms 12. Otherwise, though, additional length adjusting assemblies 18 may be provided, as needed on the outer or inner arm surfaces. Still further, such assemblies 18 might be mounted interiorly of each arm 12 such as by way of a draw cord which could be cinched to length, without permitting access thereto by the child.

Figure 5:
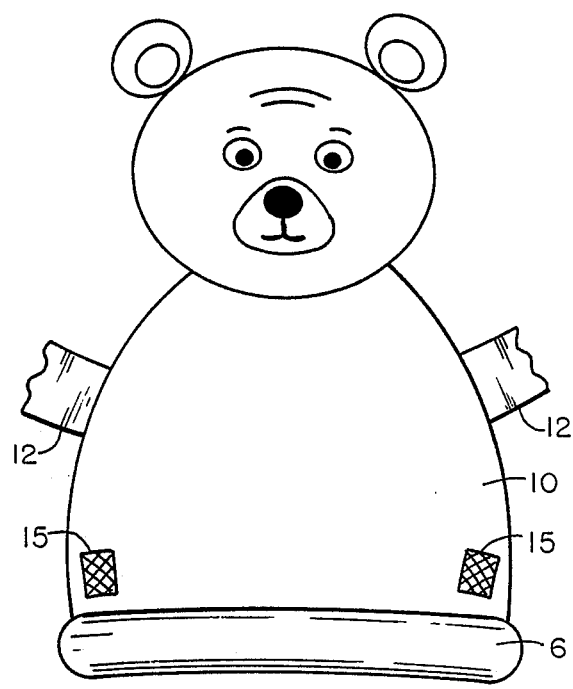
FIG. 5 shows a cushion back in the shape of a teddy bear.

Finally with attention to FIG. 5, a view is shown of a cushion seat back 10 in the shape of a teddy bear and wherefrom furry arms 12 with paws extend. In a similar fashion, lions, giraffes, cartoon characters or other child appealing shapes may be employed with corresponding arms and paws.

While the invention has been described with respect to its presently preferred embodiment and various modifications thereto, it is to be appreciated that still other modifications may be made by those of skill in the art, without departing from the spirit and scope thereof. Accordingly, it is contemplated that the following claims should be interpreted so as to include all those equivalent embodiments within the spirit and scope thereof.

What is claimed is:

1. A vehicular seat belt training cushion for children comprising in combination:
   (a) a padded seat portion;
   (b) a padded back portion hingeably mounted to said seat portion, said seat and back portions conformably mounting to an immediately underlying vehicle seat;
   (c) a pair of padded arms, each attached to and extending outward from opposite sides of said back portion and each including means for adjusting arm length;
   (d) means for fastening mating, buckle containing, distal ends of a vehicle restraint, whose proximal ends are secured to the vehicle, to said arms; and
   (e) means for securing said arms to one another in overlapped relation such that the vehicle restraint relative to the seated child is obscured from view.

2. A seat cushion as set forth in claim 1 wherein said fastening means comprises a plurality of elastic band members mounted to said padded back and arms and beneath which the mating ends of said vehicle restraint mount.

3. A cushion as set forth in claim 1 wherein said padded back portion is constructed in the shape of an animal and said arms are of a corresponding animal shape.

4. A vehicular seat belt training cushion for children comprising in combination:
   (a) a padded seat portion;
   (b) a padded back portion hingeably mounted to said seat portion, said seat and back portions mountable in conforming relation to an immediately underlying vehicle seat and in combination exhibiting a contoured shape of an animal;
   (c) a pair of padded arms attached to and extending from opposite sides of said back portion, conforming in shape to the extremities of the animal mimicked by said seat back portion and each including means for adjusting arm length and means for securing said arms in overlapped relation to one another; and
   (d) a plurality of loops secured to said back portion and arms and through which mating, buckle containing, distal ends of a vehicle restraint, whose proximal ends are secured to the vehicle, mount in concealed relation to said arms and a seated child.

* * * * *